(No Model.)
S. ARLETH.
SAD IRON HEATER.
No. 575,196. Patented Jan. 12, 1897.
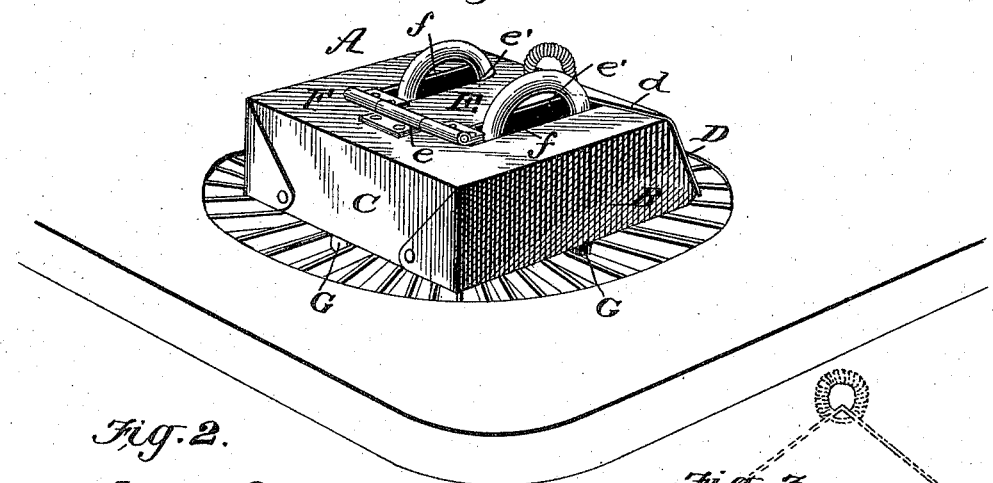
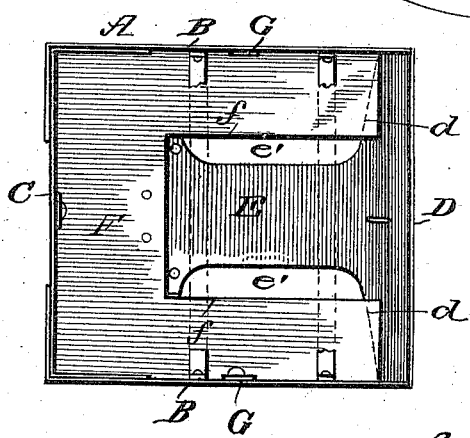
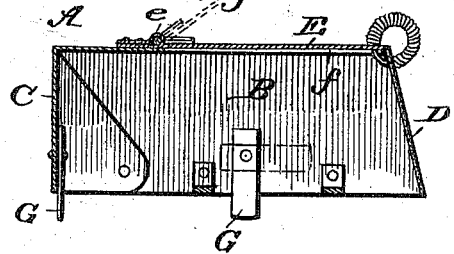
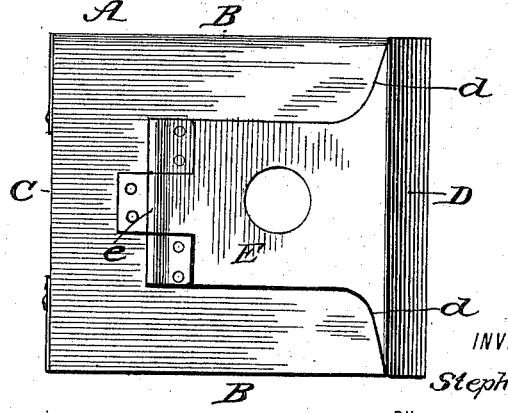
WITNESSES:
J. A. Ryan
P. B. Turpin
INVENTOR
Stephen Arleth.
BY
Munn & Co.
ATTORNEYS.

UNITED STATES PATENT OFFICE.

STEPHEN ARLETH, OF HOLLAND, MICHIGAN.

SAD-IRON HEATER.

SPECIFICATION forming part of Letters Patent No. 575,196, dated January 12, 1897.

Application filed March 18, 1896. Serial No. 583,729. (No model.)

*To all whom it may concern:*

Be it known that I, STEPHEN ARLETH, of Holland, in the county of Ottawa and State of Michigan, have invented a new and useful Improvement in Sad-Iron Heaters, of which the following is a specification.

My invention is an improvement in sad-iron heaters for use on gasolene, gas, or ordinary cook-stoves, and has for its object to provide simple means whereby the heat may be concentrated upon the iron, so the latter may be quickly and thoroughly heated, and to so construct the heater that the irons may be readily placed in or taken therefrom.

The invention consists in certain novel constructions and combinations of parts, as will be hereinafter described, and pointed out in the claims.

In the drawings, Figure 1 is a perspective view of my holder with the irons in place and the lid closed in full lines and open in dotted lines. Fig. 2 is a bottom plan view of the holder. Fig. 3 is a vertical longitudinal section thereof, showing one of the legs turned down in full lines and up in dotted lines; and Fig. 4 illustrates the heater for irons with detachable handles.

The holder A may be made of copper or other sheet metal or of any other suitable material and may be lined with asbestos and made of any suitable shape. It is shown as rectangular, having the sides B B and the back C, and having its front open and arranged to be closed by the flange D of the lid E. The top F has an opening $f$ leading to the open front of the holder, and the lid E is hinged at $e$ to the top, and when closed tends to close the opening $f$. This lid has its side edges cut away, forming openings $e'$ for the handle of the irons, and these openings $e'$ also create a draft which draws the heat up around the iron to heat on all sides at the same time.

To insert the irons, the lid may be raised, the irons put in, and the lid lowered, closing the holder, except for the handle-openings, which are desirable for creating draft, as before described.

For irons with detachable handles one opening in the center, as shown in Fig. 4, to produce the draft is all that will be ordinarily necessary.

The lid just back of the flange D has a lateral portion or portions $d$, which rest upon the top of the heater and limit the downward movement of the lid. To the sides B and back C are pivoted legs G, which may be turned down to fit in the meshes or slats of gasolene-stoves and so steady the holder in position, or such legs may be turned up to fit the heater to rest flat upon the ordinary cooking-stove.

In addition to being a convenience in heating the irons the improved heater saves fuel, as it does not require so hot a fire as when the heater is not used.

Having thus described my invention, what I claim as new, and desire to secure by Letters Patent, is—

1. The improved sad-iron heater herein described having its front open and its top provided with an opening leading to said front, the hinged lid having a drop-flange closing the open front and provided near said flange with lateral stop portions and having the edge openings for the handles and the pivoted legs all substantially as and for the purpose described.

2. The improved sad-iron heater herein described having its front open and its top provided with an opening leading to said front, the hinged lid having a drop-flange closing the open front and provided near said flange with lateral stop portions and having the edge openings for the handle all substantially as and for the purposes set forth.

3. A sad-iron heater comprising the holder adapted to receive the iron and the legs pivoted to said holder and adapted to be turned up alongside said holder or down below the same to engage the meshes or slats of the stove-top substantially as shown and described.

STEPHEN ARLETH.

Witnesses:
UREE BREYMAN,
LEONARD DEVRIES.